Figure 1:
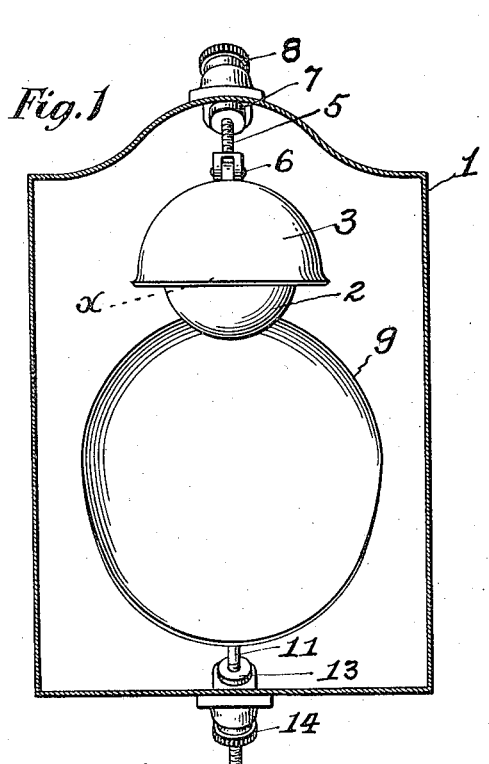

W. B. KOECHLEIN.
ANTIFLARE DEVICE.
APPLICATION FILED JULY 22, 1915.

1,205,224. Patented Nov. 21, 1916.

Witnesses:
M. E. Levy
Joseph J. Dougherty

Inventor:
William B. Koechlein
By his Attorney.

UNITED STATES PATENT OFFICE.

WILLIAM B. KOECHLEIN, OF BOUNDBROOK, NEW JERSEY, ASSIGNOR OF ONE-THIRD TO ALEXANDER MORECRAFT AND ONE-THIRD TO THEADORE T. STAATS, BOTH OF BOUNDBROOK, NEW JERSEY.

ANTIFLARE DEVICE.

1,205,224.   Specification of Letters Patent.   Patented Nov. 21, 1916.

Application filed July 22, 1915. Serial No. 41,218.

*To all whom it may concern:*

Be it known that I, WILLIAM B. KOECHLEIN, a citizen of the United States, and a resident of Boundbrook, in the county of Somerset and State of New Jersey, have invented a certain new and useful Improvement in Antiflare Devices, of which the following is a full, clear, and exact description, whereby anyone skilled in the art may make and use the same.

The invention relates to lamps and is designed to obviate the flare which is occasioned particularly on reflector lamps of nominal high power.

It relates more particularly to an adjustment of the reflector plates, by which certain rays of light may be projected directly into a given field or area, while certain other of the rays of light will be diffused and directed for general illuminative purposes.

Lamps of the search-light type, or "headlights," such as are commonly used on motor boats, automobiles and other vehicles are ordinarily provided with a reflector for projecting the rays of light to a considerable distance, and in this projection the rays are more or less concentrated. While the source of light itself may not be of great intensity, the projection and concentration of its rays into a given and limited field or area causes what is commonly known as "flare." At certain points within the field of projection, the direct rays are so concentrated and intense as to be in effect blinding to the eyes of one approaching in the opposite direction from that in which the light is projected. The general idea of providing a means for preventing flare is not new in the art. For instance, screens, lattices, refractory lenses, and other devices have been employed for breaking up the light rays or giving them indirect projection so that from almost any point there would be no "flare." Such devices are ordinarily attached to the lamp beyond the point of emanation of light and in advance of the reflector or point of projection. Such devices while breaking up the field of projection, naturally, detract largely from the lighting power of the lamp.

It is one of the principal objects of the present invention to employ in conjunction with the lamp an arrangement of adjustable reflectors so disposed that a full and direct ray of light projected may be directed within a given field or area, and certain other rays of light may be diffused for general illuminating purposes.

It is a further object to provide an adjustment of the projecting elements whereby the field of projection and the direct projection may be controlled.

A still further object is to provide an arrangement by which the lamp itself (or the source of light) is hidden from ordinary points of vision, and by which arrangement the rays of light may be projected through the media of adjustable reflecting surfaces in such manner that the projected beams of light may be controlled both as to field, concentration and direction.

With such device it is obvious that an adjustment may be made which will provide for giving a full light for any given height above the road surface, or the surface being traversed by a vehicle. It is equally obvious that with such control the occupant of an "on-coming" vehicle cannot possibly be subjected to the flare as he would be in an ordinary lamp. The field of light is controllable below his immediate range of vision. The light is not diminished and the projective force of field available upon the road is just as great as in any lamp. In fact, the projected rays give a full concentrated light for any designated point in advance of the vehicle, while the diffused rays give general illumination that enhances the operative effect.

Figure 2:
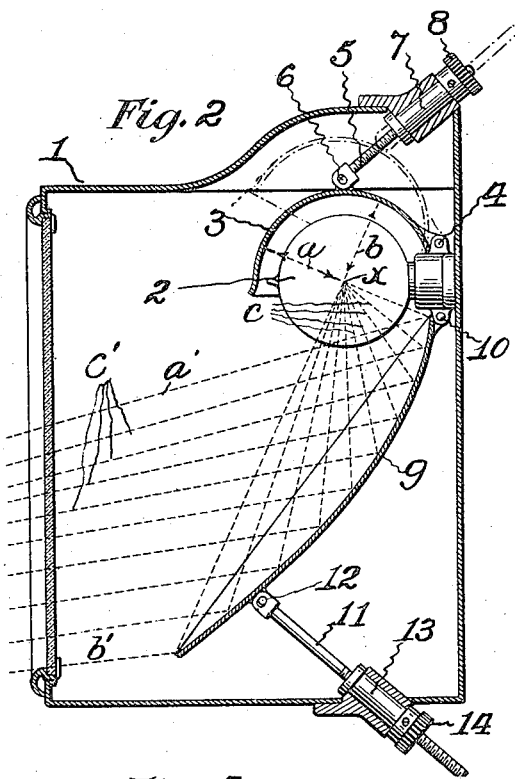
Figure 3:
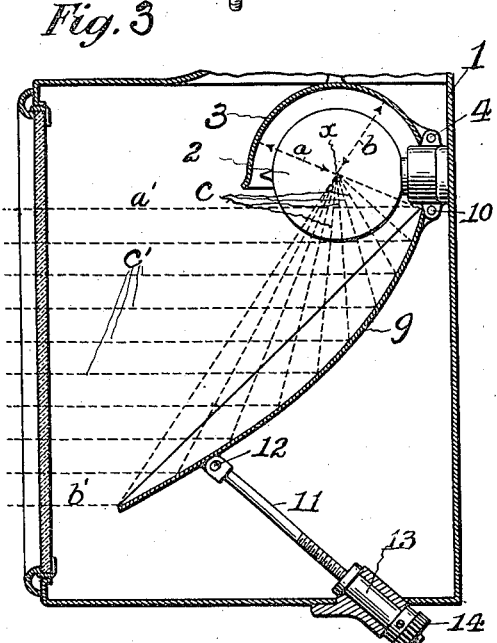
Figure 4:
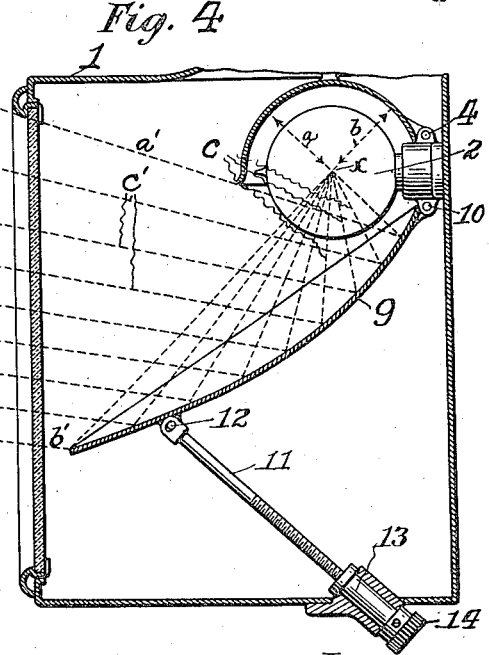

Referring to the drawings: Figure 1 is a view in front elevation of a lamp embodying the improvement. The lens and casing are cut in section to better illustrate the construction. Fig. 2 is a vertical section through the lamp, illustrated in Fig. 1 with diagrams illustrating the projection of light rays. Fig. 3 is a similar view showing the lower projector slightly raised. Fig. 4 is a similar diagrammatical view illustrating the effect of further raising the lower projector.

A casual examination of the drawings indicates that the reflective media is in substance a sectional reflector, the various parts of which are adjustable so that light rays may be reflected directly over the point of emanation to one reflective surface, thence directed to the second surface and being along the same or diverse lines with reference to the direct reflection to the second surface over the point of emanation gives a peculiar and unusual projection of the light rays. With this system it is possible to concentrate the light within a definite area, reflect or widen the field of concentration to almost any degree, and to maintain an immediate direct diffusion in conjunction with the concentrated projection of light.

Referring to the drawings, the numeral 1 denotes a lamp casing, which, of course, may be of any desired type or form to suit any particular requirement. As illustrated, this casing 1 has suitably mounted in it an incandescent bulb 2, although it is quite obvious that the possibilities of the devices are not limited to an incandescent lamp. Suitably hinged with reference to the horizontal axis of the light 2, there is a circular mirror or reflector 3, which is designed to partially cover and inclose the lamp 2. From a forward horizontal position, approximately a little more than half of the lamp is covered by the reflector 3. This reflector is illustrated as hinged or pivoted as at 4, and is controlled as to its position by an adjusting member 5, which is illustrated herein as pivoted to the reflector as at 6, and extends out through a bushing member arranged in the casing. As illustrated, the adjusting member 5, is threaded and is moved backward and forward through the bushing member by a knurled adjusting button 8. It will be seen from this construction that the reflecting member 3, may be raised or lowered with reference to the lamp by swinging it upon its pivot 4, so that it will reflect and direct the rays of light to different points.

Extending below the lamp there is a main reflector 9, which is pivoted as at 10, and is moved and positioned by an adjusting device 11, similar to that employed in conjunction with the reflector 3. As illustrated the adjusting element 11 is pivoted to the reflector 9 as at 12, and extends through a bushing 13, which is threaded and moved by a knurled nut 14. The semi-spherical reflector 3, is preferably of a form to directly reflect the rays of light directly through the point of emanation to the reflector section 9. The direct rays from the light also strike the reflector section 9, and are projected thereby. There is therefore a direct projection by the reflector 9, from the source of light, and a reflected projection of rays as they are projected from the reflector 3, to the reflector section 9. The field of projection and the intensity is contracted by the relative adjustment of the two reflective surfaces 3 and 9.

As illustrated in Fig. 2, the rays $a$ and $b$, are shown as emanating from the central light point $x$; and when reflected by the member 3, against the reflector 9 and projected as indicated by the dotted lines $a'$, $b'$. Other light rays are indicated at $c$, $c'$, and represent rays reflected from the member 3, as well as direct rays from the light point $x$, with the reflecting members adjusted as shown in Fig. 2. It is apparent that the rays are somewhat concentrated and are in a general sense directed downward.

In Fig. 3, the upper mirror or reflector 3, remains in the same position as in Fig. 2, while the lower reflector 9 has been swung upward until the projected rays of light are in substantial parallelism, and substantially in horizontal lines. The field of projection as in this case enlarged as compared with the showing of Fig. 2, and yet the source of light is still hidden by the reflector member 3. That is, the point of emanation or light source is hidden from one looking toward the lamp. Therefore, there is no direct "flare" such as occurs when the lamp is at the local point of a parabolic mirror.

In Fig. 4, the lower mirror is shown as adjusted even lighter than in Fig. 3. In this case there is an obvious enlargement of the projected field of light.

The diagrams have not been carried out to show all the possible changes when the position of the upper reflector 3, is changed, but it will be quite apparent that, by adjusting the two reflectors, practically any, field of projection can be secured, and the degree of concentration of light may be modified. It is therefore possible to so adjust a head light or search light on a vehicle that the path of travel or roadway will be perfectly illuminated without projecting the flaring beams of light into the eyes of those approaching in an opposite direction. A further and great advantage is, that an adjustment may be made from vehicles of different heights. Therefore a standard lamp may be employed and when equipped with the adjustable reflectors, it will serve equally well on vehicles of all heights without producing dangerous and uncomfortable "flare."

Obviously the exact form of the device may be varied to any extent to suit specific conditions and the shape and form of the reflective surfaces may be modified to suit the exigencies of any particular demand. The important factor with any form of reflector is, that, the reflector be made sectional and its sections be adjustable with reference to the light and to each other. It is also important that the lamp be so far inclosed that its direct rays will not be confused with the reflected rays and thus cause "flare."

What I claim as my invention and desire to secure by Letters Patent is:—

1. An anti-flare device in conjunction with a source of light; consisting of a plurality of reflector members, each adjustable upon a horizontal axis with reference to the opposed reflector and with reference to the source of light, one of said reflector members partially inclosing the source of light and directing its rays to the other of the reflector members and adjustable for cutting off direct horizontal rays emanating from the source of light without impeding the reflected rays of light.

2. An anti-flare device in conjunction with a source of light; consisting of a plurality of reflective members, both members adjustable upon adjacent horizontal axes with reference to each other and with reference to the source of light, one of said reflective members partially inclosing the source of light although reflecting light rays thereof to the opposed reflector and cutting off the direct horizontal rays emanating from the source of light, and means for individually adjusting each of the reflective members with reference to the other and with reference to the source of light.

3. An anti-flare device to be used in conjunction with the source of light; consisting of a semi-spheroidal reflector pivoted on a horizontal axis and inclosing the source of light against direct horizontal transmission of its rays, a coöperating horizontally pivoted reflector against which the semi-spheroidal reflector directs the rays or light of the source, means for adjusting the semi-spheroidal reflector, and means for adjusting the coöperating reflector.

4. An anti-flare device to be used in conjunction with a source of light; consisting of a reflector inclosing the source of light to prevent direct horizontal transmission of its rays, a coöperating reflector transversely disposed to and adjustable with reference to a horizontal projection of the rays of light and means for adjusting both reflector members with reference to each other toward and away from a common horizontal plane and with reference to the source of light.

5. In a lamp, a casing, a source of light in fixed relation to the casing, a pair of reflectors horizontally pivoted for individual adjustment with reference to each other and with reference to the source of light, one of said reflectors reflecting light rays to the other and preventing direct rays of light from the source above a given horizontal plane, and adjusting devices for each of the reflectors extending through the casing and accessible from the exterior thereof.

WILLIAM B. KOECHLEIN.

Witnesses:
BESSIE ABRAMSON,
JOSEPH J. DOUGHERTY.